United States Patent [19]

Stoll et al.

[11] Patent Number: 4,862,912
[45] Date of Patent: Sep. 5, 1989

[54] VALVE ARRANGEMENT

[76] Inventors: Kurt Stoll, Lenzhalde 72, 7300 Esslingen; Emil Fakner, Rieslingstr. 8, 7300 Esslingen 1; Udo Preussler, Stangesntr. 37, 7022 Leinfelden-Echterdingen, all of Fed. Rep. of Germany

[21] Appl. No.: 163,295

[22] Filed: Mar. 2, 1988

[30] Foreign Application Priority Data

Mar. 7, 1987 [DE] Fed. Rep. of Germany ....... 3707353

[51] Int. Cl.$^4$ .................... F16K 31/124; G05D 16/16
[52] U.S. Cl. .............................. 137/484.2; 137/492.5; 137/627.5
[58] Field of Search .................. 137/488, 484.2, 627.5, 137/492.5

[56] References Cited

U.S. PATENT DOCUMENTS

| | | | |
|---|---|---|---|
| 1,190,799 | 7/1916 | René137 | 488/ |
| 1,745,256 | 1/1930 | Groble | 137/484.2 |
| 1,772,403 | 8/1930 | Smoot | 137/488 |
| 1,796,968 | 3/1931 | Smoot | 137/488 |
| 1,805,702 | 5/1931 | Mastenbrook | 137/492.5 |
| 1,987,505 | 1/1935 | Edler | 137/488 |
| 2,264,262 | 11/1941 | Erbguth | 137/492.5 |
| 3,146,789 | 9/1964 | Curth | 137/484.2 X |
| 3,904,175 | 9/1975 | Deschenes | 137/627.5 X |
| 3,977,423 | 8/1976 | Clayton | 137/488 X |
| 4,077,674 | 3/1978 | Doto | 137/627.5 X |

*Primary Examiner*—Stephen M. Hepperle

[57] ABSTRACT

The invention provides a valve arrangement with a pressure control valve placed on a pressure line extending between a source of fluid under pressure and a pressure system in which a constant pressure is to be maintained. The pressure control valve is able to be operated in response to a pressure sensor which is preferably in the form of a venturi element. This pressure sensor is arranged in the pressure line is placed downstream from the pressure control valve and is connected with at least one control port of a pressure switching valve arrangement subject to switching hysteresis, for the pressure control valve. The pressure control valve arrangement is operated by the pressue measured at the position of the pressure sensor. In order to amplify this signal there is the downstream pressure control valve. Owing to overlapfree switch made possible by the hysteresis long venting cycles are prevented and the number of switching operations reduced.

17 Claims, 3 Drawing Sheets

VALVE ARRANGEMENT

BACKGROUND OF THE INVENTION

The present invention relates to a valve arrangement comprising a pressure control valve which is placed in a pressure duct between a source of fluid under pressure and a pressure system and is adapted to be used with a constant pressure range that is to be maintained, said pressure control valve being adapted to be controlled in response to a pressure sensor.

Such valve arrangements are utilized to maintain a constant pressure range in a pressure system, the pressure control valve opening when the pressure in the system has sunk below a preset pressure and closing when the desired pressure has been reached again. On opening the pressure control valve it is possible for fluid under pressure to continue flowing from the pressure fluid source into the pressure system so that an increase in pressure is brought about.

A disadvantage in connection with this type of prior art valve arrangement is that the response sensitivity is insufficient and that hunting of the pressure control valve around the pressure response value is excessive so that an excessive amount of fluid under pressure escapes owing to venting of the valve or valves from the system, this being more particularly objectionable if the fluid to be controlled is used for operation of the valves and if such fluid is corrosive, evil-smelling or even toxic. Another shortcoming is often to be seen in the fact that the individual components are arranged so that it is difficult to see how they are functionally connected, long leads being needed which make assembly complex and render the system liable to failure.

SHORT OUTLINE OF THE INVENTION

One object of the invention resides in the provision of a valve arrangement of the initially mentioned type which may be compactly designed.

A further aim of the invention is to provide such an arrangement which ensures precise control of pressure.

A still further purpose of the invention is to devise such an arrangement which has a minimum number of valve operations.

The invention also has the aim of providing the valve arrangement in such a form that there is only a minimum discharge of fluid therefrom.

In order to achieve these or other objects in the invention a pressure sensor arranged in the pressure duct is placed downstream from the pressure control valve and is connected with at least one control port of a pressure switching valve arrangement which is subject to switching hysteresis and is associated with the pressure control valve.

The presence of the pressure switching arrangement subject to switching hysteresis acting as pilot valve for the pressure control valve means that there are two precise switching points, which prevent hunting of the valves around the desired pressure value. The pressure valve arrangement operating without overlap prevents prolonged discharge and thus permits to a predictable low consumption of fluid under pressure, that is to say, in the case of a pneumatic arrangement, to a low rate of gas consumption. If the gas to be kept at a constant pressure is for instance made up of $CO_2$ and $N_2$, a high rate of leakage would mean that the air in a room with only poor ventilation would be impaired even to the point of possible suffocation of the occupants. Such a danger may be substantially avoided by using the arrangement of the present invention. A further advantage of the invention is that the entire arrangement may be inserted in a pressure line leading to a pressure system as a compact unit. It is then not necessary to lay piping.

Further advantageous features of the invention are described in the claims.

The invention leads to particular advantages if the pressure sensor is in the form of a venturi element. There is in fact the danger that if, for example only a small amount of fluid is taken from the pressure system, there will be slow leakage of fluid into the same with the result that the value will never go below the lower switching point so that the pressure control valve is not able to open. This would lead to a very sluggish behavior of the valve arrangement. On slow leakage through the venturi element taking place on the other hand the sensor pressure is additionally lowered owing to the flow so that the value may go below the lower switching point. Every tendency to switch is thus enhanced and the system is forced into the terminal setting and slow switching is prevented.

If the pressure sensor and more especially a pressure sensor in the form of a venturi element is placed directly downstream from the pressure control valve and, more particularly mounted thereon, then this will be a further contribution to render the structure of the valve arrangement, which has only three or four main parts, even more compact.

In the case of the use of a three-position valve with adjustable hysteresis as the pressure switching arrangement the valve arrangement may be made up of three compactly assembled components. The switching behavior of the arrangement may be very exactly set owing to the adjustability of the hysteresis and may be modified after manufacture inasfar as each of the two switching points for the pressure control valve may separately adjusted. This is preferably undertaken using separately adjustable valve springs. A 3/3 way valve is particularly suitable which in its middle switched position separates the pressure line, a line leading to the pressure control valve and a return line from each other. Return flow of the fluid under pressure or venting is thus only possible in one setting of the valve, this leading to a predictable consumption of gas. The valve operates free of overlap with a high degree of reliability.

For the pressure switching valve arrangement it also possible to employ two pressure switching valves each of whose switching points determining the hysteresis may be adjusted. Although this leads to the necessity of having an additional component, it is possible to utilize pressure switching valves with a simpler design, in the case of which only one switching point has to be adjustable.

The compact design furthermore makes it more readily possible to arrange all the components of the valve arrangement on and/or in a common block so that the valve arrangement as a whole is generally in the form of a single component. In place of a single block it is in this case also possible to have a block provided with an integrating plate or subplate.

Working examples of the invention will now be described with reference to the accompanying drawings.

LIST OF THE SEVERAL VIEWS OF THE DRAWINGS

DETAILED ACCOUNT OF WORKING EMBODIMENTS OF THE INVENTION

Figure 1:
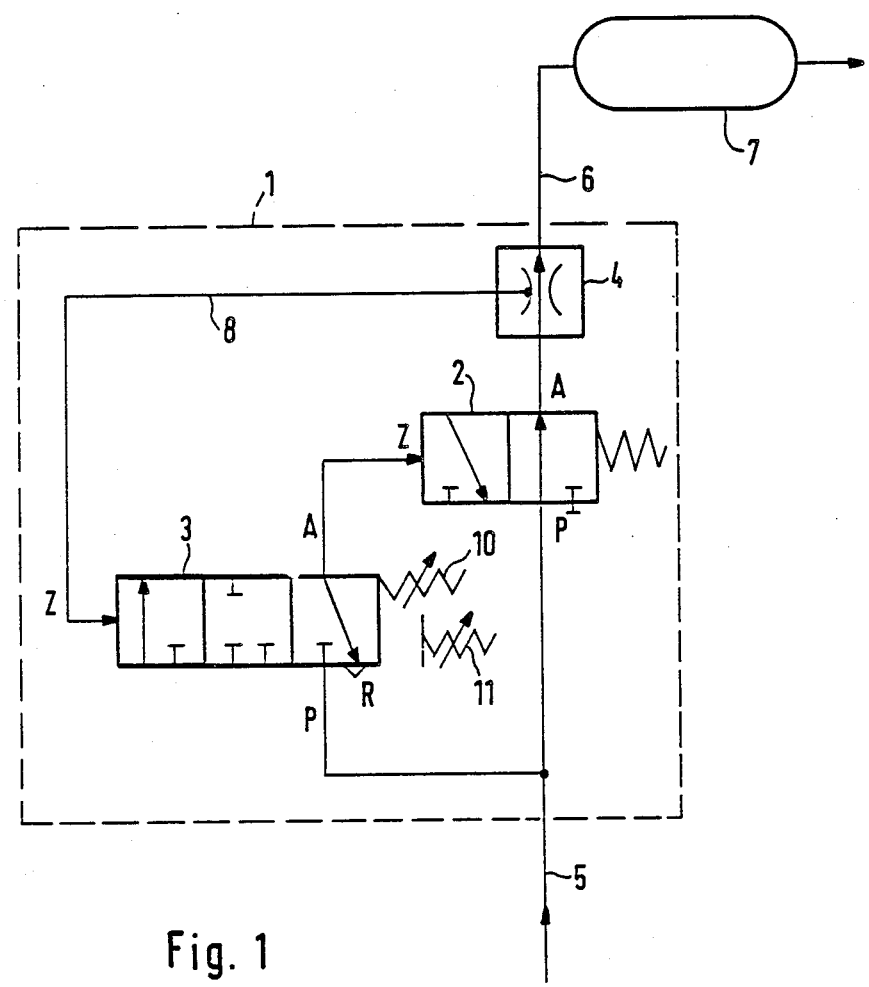
FIG. 1 is a block schematic of a first working example of the valve arrangement.

In the case of the first embodiment of the invention shown in FIG. 1 a valve arrangement 1 is made up of a pressure control valve 2 in the form of a 2 port/2 position (2/2 way) valve, a pressure switching valve 3 in the form of an adjustable-hyteresis 3 port/3 position (3/3 way) pressure control valve and a venturi element 4 designed to function as a pressure sensor. A pressure line 5 coming from a source of fluid under pressure (not shown) is connected with the pressure fluid ports P of the two valves 2 and 3. The operating port A of the pressure control valve 2 is connected via the downstream venturi element 4 (placed directly downstream from it) and a line 6 with a pressure fluid system, which is shown in the form of a pressure container 7, in which a defined constant pressure range is to be produced and maintained.

One operating port A of the pressure switching valve 3 is connected with the control port Z of the pressure control valve 2. A pressure sensor line 8 leads from the venturi element 4 to the control port Z of the pressure switching valve 3. This further has a fluid discharge port R, which if the fluid supplied is a gas, is a venting port.

In the positions illustrated fluid under pressure initially flows via the line 5, the opened pressure control valve 2, the venturi element 4 and the line 6 to the pressure container 7, where pressure is slowly built up. If for example fluid with a pressure limit of 2.7 bar is supplied via the venturi element 4 to the pressure switching valve 3 as a control pressure, the valve will be switched over into the middle switching position, in which the ports A, P and R are separated from each other. This switching pressure of 2.7 bar may be set using a first adjustable spring 10 in the pressure switching valve 3. The pressure control valve 2 is thus caused to keep in its setting.

If a second, higher switching pressure of for instance 4 bar is supplied by the venturi element 4 to the pressure switching valve 3, the latter will move into its third switching position in which the pressure line 5 is connected with the control port Z of the pressure control valve 2. This second, higher switching pressure is set by the force needed to overcome the force of a second adjustable spring 11. The pressure control valve 2 now switches into its second switching position, in which the pressure line 5 is separated from the pressure container 7.

If the pressure in the pressure container 7 is lowered, for example owing to drawing fluid under pressure therefrom, when the pressure has gone below a value of 4 bar the pressure switching valve 3 will switch back into its middle setting without this changing the setting of the pressure control valve 2. When the pressure goes below the lower switching value of 2.7 bar, the pressure switching valve 3 will return to its first setting in which owing to venting the pressure control valve 2 will also move back into its first switching position illustrated, in which fluid under pressure is again able to flow into the pressure container 7.

The presence of the venturi element 4 means that each time the tendency to switch will be amplified, that is to say when fluid flows through the venturi element 4 the pressure at the control port Z of the pressure switching valve 3 will be lowered every time and such drop in pressure will increase the tendency for this valve to be switched back. Slow leaks taking place over prolonged periods of time may thus be prevented.

The pressure control valve 2 serves on the one hand as a flow amplifier for the signal stemming from the pressure switching valve 3, and on the other, hand as a component which directly acts on the venturi element 4 so that each pressure change will be able to immediately take effect on the switching behavior.

Since on the one hand a constant pressure is to be maintained in the pressure container 7 and on the other hand it is not in the container but in the line 6 where the pressure is measured by means of the venturi element 4, it will be clear that a correction of the pressure switching points is to be undertaken corresponding to the pressure drop in the line 6.

Figure 2:
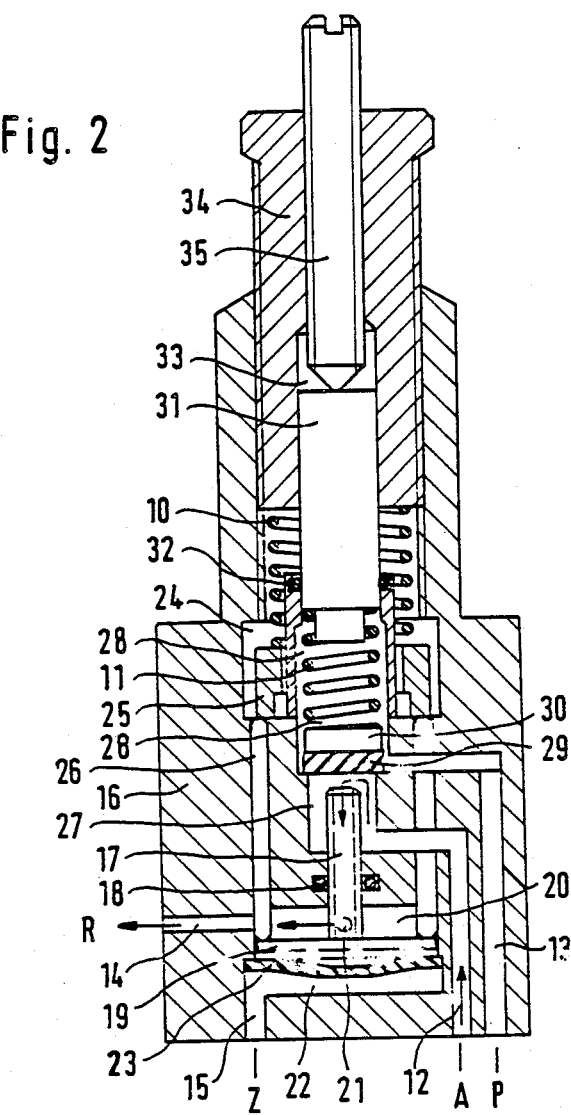
FIG. 2 shows one example in detail of the 3/3 way valve of FIG. 1 subject to hysteresis in section.

FIG. 2 shows a specific form of the invention incorporating a pressure switching valve 3 constituted by a 3/3 way valve. The ports A, P, R and Z are shown, as in FIG. 1, as the connection opeining of lines 12, 13, 14 and 15 in valve housing 16.

A first, tubular valve member 17 is able to slide axially and is supported slidingly in the valve housing 16 by way of an annular seal 18. A disk-like base member 19 is attached to the lower end of the first valve member 17 and is moved in a piston chamber 20 on axial motion of the first valve member 17. This chamber is connected via the line 14 with the fluid discharge port R. Adjacent to the piston chamber 20 the first valve member 17 has a lateral hole 21 which makes it possible for the line 14 to be continued into the interior of the first valve member.

The line 15 starting at the control port Z opens in a diaphragm chamber 22 placed under the piston chamber 20 and which is terminated at the side facing the base member 19 by means of a diaphragm 23 resting against this base member 19. If fluid under pressure is supplied to the diaphragm chamber 22, the diaphragm 23, and with it the base member 19 and the first valve member 17, will be moved against the force of the first spring 10 upwards. This spring 10 is placed between a first adjusting member 34 screwed downwards into the valve housing 16 and an annular element 25 which is able to be axially shifted in an annular chamber 24, the force of the spring being transmitted by the annular element 25 via rodlike connecting elements 26 running in axial holes to the base member 19. In lieu of the two connecting elements 26 shown in the figure it would naturally be possible also to have three or an even larger number, which would then be evenly arranged around the periphery of the annular element 25. The connecting elements 26 bear against the annular element 25 and, respectively, the base member 19 and are guided in their holes.

The upper end of the first valve member 17 extends into a first valve chamber 27, the line 14 opening at the end of this first valve member 17. The line 17 connected with the operating port A also opens into this first valve chamber 27.

Over the first valve chamber 27 there is an adjoining second valve chamber 28 with a somewhat larger cross section and into which there opens a line 13 connected with the fluid port P. A second valve member 30, on whose lower side there is a sheetlike sealing element 29, is arranged in an axially sliding manner in the second valve chamber 28 and may be moved axially against the force of the second spring 11. In the non-deflected condition the sealing element 29 shuts off the first valve chamber 27 from the second valve chamber 28 by way of a seal seat, which is not shown in detail. In this setting the line 13 as well is separated from the first valve chamber 27. The second spring in the second valve chamber 28 bears on the one hand on the second valve member 30 and on the other hand on a bolt-like transmission member 31, which extends into the second valve chamber 28 and is sealed by an annular seal 32. Outside the valve chamber 28 the transmission member 31 is arranged in a coaxial hole 3 in the first adjusting member 34 so that it may slide axially and bears against a second adjusting member 35 in the form of a screw at this position and which may be screwed from above into the first adjusting member 34.

In the non-pressurized state of the diaphragm chamber 22, that is to say when there is no or hardly any control pressure, the two valve members 17 and 30 are in their neutral setting, the fluid port P being connected with the second valve chamber 28 but being separated from the first valve chamber 27 and the operating port A being connected via to the line 12, the first valve chamber 27, the first valve member 17, the lateral hole 21, the piston chamber 20 and the line 14 with the fluid discharge port R.

If the control pressure reaches a level of for instance 2.7 bar as set by the force of the first spring 10, the diaphragm 23 is deflected to such a degree that the upper line end in the first valve member 17 comes into engagement with the sealing element 29 and is shut off. In this second, middle switching setting all the lines 12, 13 and 14 are separated from each other.

If the control pressure increases further, then as from a certain value of for instance 4 bar the second valve member 30 will move clear of its valve seat against the additional resilient force of the second spring 11 so that now the two valve chambers 27 and 28, and accordingly the lines 12 and 13 and the ports A and P, are connected with each other. This constitutes the third switching setting.

By further screwing in or screwing out the two setting member 34 and 35 it is possible for the biasing force and accordingly the force of the two springs 10 and 11 to be set independently of each other. The two switching points between the three switching setting may thus be set and modified in a simple manner almost in any required fashion. The second spring 11 together with the second valve member 30 in the second valve chamber 28 is completely surrounded with fluid under pressure so that frictional forces hardly have any effect at all. Thus extremely fine adjustment of hysteresis is possible. It is obviously possible for the second spring 11 to be arranged outside the second valve chamber, as for instance in the hole 33. The degree of precision of adjustment of the switching points will be dependent on the pitch of the threads of the two adjusting members 34 and 35. Scales, which are not shown, on the two adjusting members 34 and 35 may then be used for rapid and reliable setting.

Figure 3:
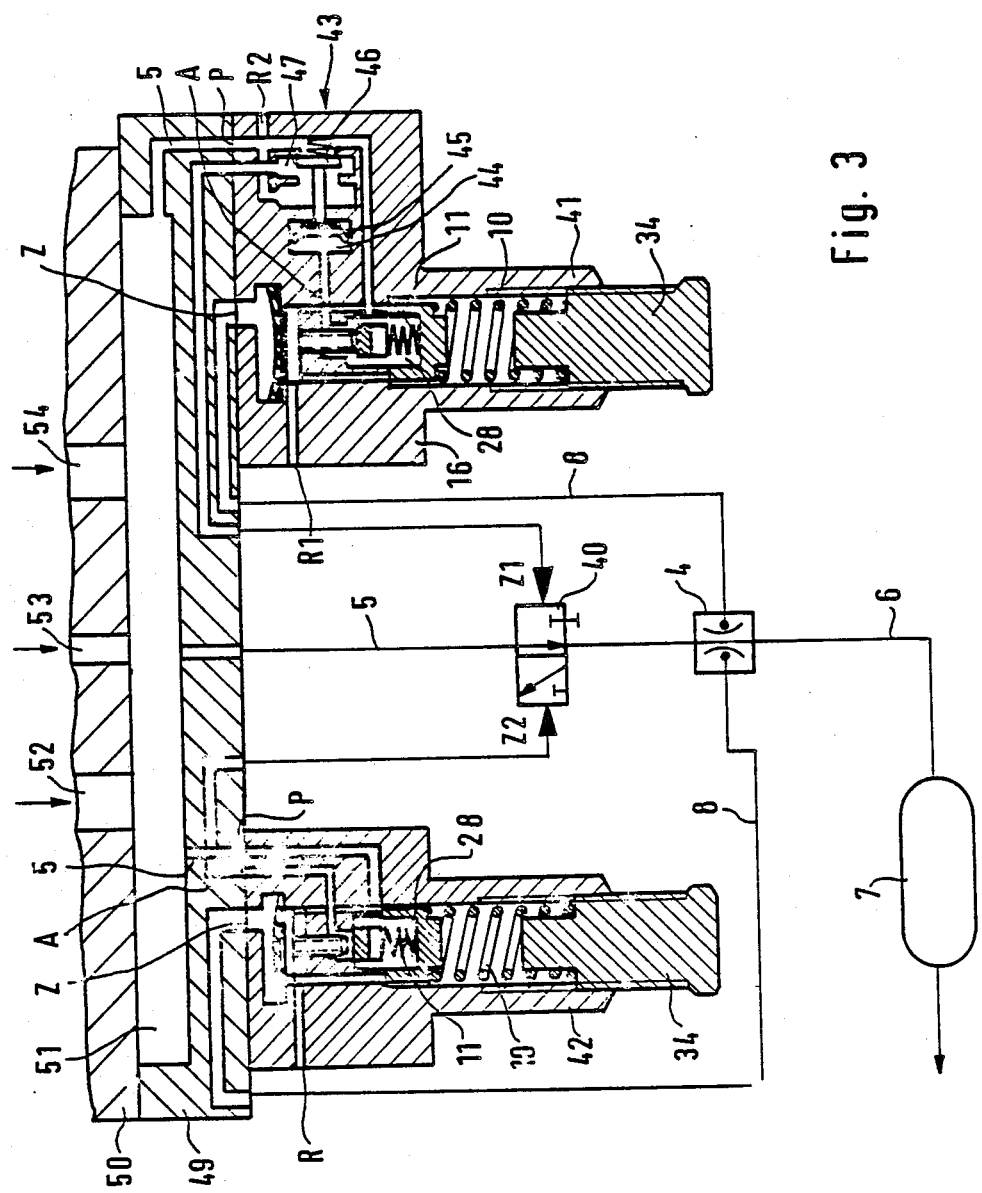
FIG. 3 shows a second embodiment of the valve arrangement with two 3/3 way valves.

In the case of the second working example of the invention shown in FIG. 3 in place of the pressure control valve 2, which is held in its first switched position by the force of a spring, there is a pressure control valve 40 which is also in the form of a 2/2 way valve. This pressure control valve 40 is now controlled by a pressure switching or pulse valve in which the switching position is changed to another position by a short signal and changed back to the original switching position by another, counter signal arrangement, which is formed by two 3/3 way pressure switching valves 41 and 42. These two pressure switching valves 41 and 42 are generally identical to the pressure switching valve shown in FIG. 2 and which has been described in detail so that no further description is necessary here. Unlike the pressure control valve 3 there is no need for the transmission member 31, the hole 33 and the second adjusting member 35. The second spring 11 in each case bears against the end face of the second valve chamber 28 and unlike the first spring 10 is not able to be adjusted.

On the valve housing 16 of the pressure switching valve 41 there is an inverting valve 43 (made in one or two parts), which has a control plunger 45 moving in a control pressure chamber 44. The control plunger 45 is connected with a valve member 46, which moves in a valve chamber 47 connected with the control port $Z_1$ of the pressure control valve 40. In the pressureless state of the control chamber 44 the valve member 46, acted upon by the force of a spring 48, shuts off a left hand opening of the valve chamber 47 so that the pressure line 5 is connected via the pressurized fluid port P with the control port $Z_1$. If on the other hand the control plunger 45 is deflected against the force of the spring 48 the valve member 46 will shut off a right hand opening of the valve chamber 47. In this valve setting the control port $Z_1$ of the pressure control valve 40 is connected with a fluid discharge port $R_2$. If the fluid used is air this will be a venting port. A further fluid discharge port $R_1$ is generally the same as that marked R in FIG. 2.

In the case of the second pressure switching valve 42 the operating port A is connected with the control port $Z_2$ of the pressure control valve 40. The pressure line 5 is connected with the pressurized fluid line 5. Both the control ports Z of the two pressure switching valves 41 and 42 are connected with the venturi element 4 via a respective pressure sensor line 8.

The two pressure switching valves 41 and 42 are secured to a block made up of two parts 49 and 50 to form a unit with it. It is obviously possible for the pressure control valve 40 and the venturi element 4 to also be secured to the block, although this is not shown in detail, so that the overall valve arrangement forms a single, coherent unit. A cavity 51 is formed at the joint between the two parts 49 and 50 and three lines 52, 53 and 54 supply fluid under pressure thereto. It constitutes the source of fluid under pressure for the valve arrangement. The pressure lines 5 run from this cavity 51 to the three valves 40 to 42. It is possible for the cavity 51 to be supplied various other fluids via the lines 52 to 54 and then it serves as a mixing chamber for them.

The lines or ducts described are partly within the part 49 and 50 of the block, that is to say, they are integrated in the block. If in addition the pressure control valve 40 and the venturi element 4 are mounted on the block, it is naturally then possible for all the lines to be arranged in this block so that it is possible to ensure that there are no lines of the valve arrangement which are not buried in the structure thereof.

The workings of the second embodiment of the invention shown in FIG. 3 are generally identical to those of the first example shown in FIG. 1 subject to the reservation that in this case one of the two hysteresis switching points is set respectively by one of the two pressure switching valves 41 and, respectively, 42. Firstly fluid under pressure will flow through the lines 5 and 6 to the pressure container 7, the venturi element 4 having a slight pressure of for instance less than 2.7 bar. The control port $Z_2$ is connected via the pressure switching valve 42 as shown with the fluid discharge or venting port R. The right hand pressure switching valve 41 is also located in its neutral setting, the valve member 46 shutting off the left hand opening of the valve chamber 47 so that the pressure line 5 is connected with the control port $Z_1$ of the pressure control valve 40. If the pressure measured at the venturi element 4 exceeds the first switching pressure of, for instance, 2.7 bar, the switching setting of the pressure switching valve 42 will remain unaltered, while the pressure switching valve 41 will be shifted into its middle setting, in which its three ports A, P and $R_1$ are separated from each other. This is without any effect on the pressure control valve 40.

If a second and higher control pressure of for instance 3 bar is now exceeded, the pressure switching valve 42 will also shift into its middle setting, this again being without effect on the pressure control valve 40.

If now a third even higher switching pressure of for instance 3.5 bar, is exceeded, the pressure switching valve 41 will move into its third setting as shown without any change in the setting of the pressure control valve 42. In this third setting of the valve 41 the pressure line 5 will be connected with the control pressure chamber 44. As a result of this, the control plunger 45 will be shifted into its position as indicated, in which the control port $Z_1$ of the pressure control valve 40 is connected with the fluid discharge or venting port $R_2$, that is to say in the case of the fluid being a gas, such gas will be vented off through the control port $Z_1$. Since the pressure control valve 40 is designed in the form of a pulse valve, it does not change its setting.

It is only when a fourth, still higher switching pressure of for instance 4 bar is exceeded that the left hand pressure switching valve 42 will move into its third switching setting in which the pressure line 5 is connected with the control port $Z_2$. The pressure control valve 40 is changed round or reversed owing to this and shuts off the further supply of fluid to the pressure container 7.

If the pressure measured at the venturi element 4 goes down again the pressure control valve 40 will keep in its shut off setting until the first switching pressure of 2.7 bar is no longer reached, i.e. the pressure is below this value. It is only when this state is reached that the pressure in the control pressure chamber 44 may be let off via the fluid discharge port $R_1$ so that the inverting valve 43 will be switched round and will thus connect the pressure line 5 with the control port $Z_1$ again. The pressure control valve 40 is thus opened again.

The first and fourth switching pressures (of for instance 2.7 and 4 bar) may be set separately from each other by turning the setting members 34 on the two pressure switching valves 41 and 42.

In lieu of the two 3/3 way valves as employed in the present working example of the invention it would be possible to utilize simpler valves such as 2/2 way valves, each with a pressure regulating valve upstream from it.

We claim:

1. A valve arrangement comprising a pressure control valve, a pressure line on which said control valve is placed, said line running between a source of fluid under pressure and pressure system in which constant pressure is to be maintained, a sensor, said pressure control valve being arranged to be controlled in response to a pressure measured by said sensor, said sensor being arranged on said pressure line downstream from said pressure control valve, a pressure switching valve arrangement for the pressure control valve and being subject to hysteresis, said pressure sensor being connected with at least one control port of said pressure switching valve, and the switching valve arrangement being made up of two pressure switching valves, each of which is able to be adjusted for setting switching pressure levels determining the hysteresis.

2. A valve arrangement comprising a pressure control valve, a pressure line on which said control valve is placed, said line running between a source of fluid under pressure and pressure system in which constant pressure is to be maintained, a sensor, said pressure control valve being arranged to be controlled in response to a pressure measured by said sensor, said sensor being arranged on said pressure line downstream from said pressure control valve, a 3/3 way pressure switching valve arrangement for the pressure control valve comprising two individually adjustable valve springs respectively defining two pressure levels necessary to switch from a first to a second, and from a second to a third of the three valve settings, a line connecting said pressure sensor with at least one control port of said pressure switching valve, a line leading from the pressure switching valve to the pressure control valve and a return line, the pressure switching valve being arranged in a middle setting thereof to separate the pressure line, the line leading to the pressure control valve and the return line from each other.

3. The valve arrangement as claimed in claim 1 wherein said pressure sensor comprises a venturi element.

4. The valve arrangement as claimed in claim 1 wherein the pressure sensor is placed immediately downstream from the pressure control valve.

5. The valve arrangement as claimed in claim 2 wherein said pressure control valve is so designed as to be set by the three position valve against the force of a spring.

6. The valve arrangement as claimed in claim 1 wherein each pressure switching valve comprises an adjustable valve spring determining one of the two switching pressure levels.

7. The valve arrangement as claimed in claim 6 wherein the pressure control valve has two control ports for the two switching settings, each of such ports being functionally connected with one of the pressure switching valve.

8. The valve arrangement as claimed in claim 7 comprising two similar pressure switching valves, a control output port of one such valve being directly connected with one of the control ports and the control output port of the other being indirectly connected via an inverting valve with the other of the control ports of the pressure control valve.

9. The valve arrangement as claimed in claim 1 wherein the pressure switching valves are in the form of 3/3 way valves.

10. The valve arrangement as claimed in claim 1 wherein the pressure control valve is in the form of a 2/2 way valve.

11. The valve arrangement as claimed in claim 1 wherein the pressure control valve is in the form of a pulse valve.

12. The valve arrangement as claimed in claim 1 in the form of part of a common block.

13. The valve arrangement as claimed in claim 2 wherein said pressure sensor comprises a venturi element.

14. The valve arrangement as claimed in claim 2 wherein the pressure sensor is placed immediately downstream from the pressure control valve.

15. The valve arrangement as claimed in claim 2 wherein the pressure control valve is in the form of a 2/2 way valve.

16. The valve arrangement as claimed in claim 2 wherein the pressure control valve is in the form of a pulse valve.

17. The valve arrangement as claimed in claim 2 in the form of part of a common block.

* * * * *